United States Patent
Chen et al.

(10) Patent No.: US 9,596,130 B2
(45) Date of Patent: Mar. 14, 2017

(54) METHOD AND SYSTEM FOR LINK SWITCHING

(71) Applicant: ZTE Corporation, Shenzhen (CN)

(72) Inventors: Chunlei Chen, Shenzhen (CN); Yong Qian, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/651,321

(22) PCT Filed: Dec. 6, 2013

(86) PCT No.: PCT/CN2013/088805
§ 371 (c)(1),
(2) Date: Jun. 11, 2015

(87) PCT Pub. No.: WO2014/090120
PCT Pub. Date: Jun. 19, 2014

(65) Prior Publication Data
US 2015/0333952 A1 Nov. 19, 2015

(30) Foreign Application Priority Data

Dec. 12, 2012 (CN) .......................... 2012 1 0534801

(51) Int. Cl.
*H04L 12/26* (2006.01)
*H04L 12/56* (2006.01)
*H04L 12/24* (2006.01)
*H04L 12/707* (2013.01)

(52) U.S. Cl.
CPC ...... *H04L 41/0663* (2013.01); *H04L 43/0811* (2013.01); *H04L 45/22* (2013.01)

(58) Field of Classification Search
CPC ... H04L 41/0663; H04L 45/22; H04L 43/0811
See application file for complete search history.

(56) References Cited

U.S. PATENT DOCUMENTS

| 8,102,848 | B1 * | 1/2012 | Rao | H04L 45/16 370/253 |
| 2010/0002593 | A1 * | 1/2010 | Wang | H04L 41/0677 370/242 |
| 2011/0085440 | A1 * | 4/2011 | Owens | H04J 3/14 370/216 |

FOREIGN PATENT DOCUMENTS

| CN | 102045332 A | 5/2011 |
| CN | 102739535 A | 10/2012 |
| CN | 102857419 A | 1/2013 |
| CN | 103036716 A | 4/2013 |

OTHER PUBLICATIONS

International Search Report for corresponding application PCT/CN2013/088805 filed Dec. 6, 2013; mail date Feb. 20, 2014.

* cited by examiner

*Primary Examiner* — Kiet Tang
(74) *Attorney, Agent, or Firm* — Cantor Colburn LLP

(57) ABSTRACT

The disclosure provides a method and system for link switching. The method includes: acquiring a warning message, wherein the warning message is sent via broadcast or multicast by a line card where a failure of a link occurs; executing link switching according to the warning message. Through the technical solutions provided by the disclosure, the efficiency of the link switching in a distributed system is improved.

6 Claims, 4 Drawing Sheets

METHOD AND SYSTEM FOR LINK SWITCHING

TECHNICAL FIELD

The disclosure relates to the communications field, and in particular to a method and system for link switching.

BACKGROUND

With the development of communications technologies, ALL Internet Protocol (IP) network has gradually become reality in network construction of operators. Every operator has basically stopped newly building a traditional voice switching network and existing service also gradually starts to be transformed into the direction of an IP carrier. At present, an IP network in the related art is a "best-effort" service model, and neither the quality of service nor the reliability can achieve levels of a traditional telecommunications network. The telecommunications network, which is more sensitive to the reliability of a link, generally requires that switching of a host link and a backup link can be implemented within 50 milliseconds (ms) when a link fails. That is, a service is switched from the host link, which fails, to the backup link within 50 ms. Various link detection protocols, including Bidirectional Forwarding Detection (BFD), Operations, Administration and Maintenance (OAM) of Multiprotocol Label Switching-Transport Profile (MPLS-TP), and so on and various link switching mechanisms have been put forward in the industry in order to solve the above technical problem.

Generally, each host link corresponds to a backup link in the telecommunications network, and the two links form a host-backup relation, that is a protection group. When the host link fails, a service is switched to the backup link. A link detection protocol session, such as BFD, and MPLS-TP OAM, is configured on the host link. Such detection protocols, which are highly sensitive, are able to detect a failure of the host link in time. The detection protocols, which are required to be highly sensitive, need to be supported by one or more hardware chips and are generally implemented on one or more line cards. A warning is generated when the link detection protocol session detects a failure of the host link. Information of the warning may be notified to a Central Processing Unit (CPU) on a line card directly so as to perform link switching. Of course, the information of the warning may be also firstly notified to the CPU on the line card, subsequently notified by the CPU on the line card to a CPU on a main control board, and finally notified by the CPU on the main control board to the CPU on the line card to perform the switching. Apparently, the former method is fully adequate to complete link switching when there is only one line card in a system, but is only able to complete link switching where a session locates when there is a plurality of line cards in the system, thus failing to complete link switching on other line cards.

Generally, a high-end device in a network applies a fully distributed architecture, mainly consisting of a main control board, one or more line cards and a switching network. The main control board is configured to take charge of a system control plane. Each line card is configured to take charge of a control plane and a data forwarding plane of a line card itself. A data forwarding service between the one or more line cards is performed by the switching network. The main controller board communicates with the one or more line cards via one or more messages. In a distributed system, there is an entry of a forwarding table of a data forwarding plane on each line card for a multipoint-to-multipoint service. Through the former method, although switching is performed by a forwarding link on a line card where the link detection session locates, services on other line cards are still operating on the host link where a failure occurs. Therefore, only the latter switching method can be used in the distributed system. Link switching is performed directly by the line card where the link detection session locates while the main controller board is notified. The main controller board then synchronizes switching information to other line cards, and the other line cards perform link switching after receiving a switching message. However, such a method has a obvious disadvantage, that is, the efficiency of switching depends on the efficiency of synchronizing a message between boards while the efficiency of synchronizing the message between boards is uncontrollable. Besides, a message may be also lost if the message is not processed in time when there are a large number of messages between boards.

SUMMARY

The embodiments of disclosure provides a method and system for link switching, so as to at least solve the problem in the related art that switching information cannot be synchronized to other line cards in time when the link switching is performed by a line card in a distributed system.

A method for the link switching is provided according to one aspect of the disclosure.

The method for the link switching according to the disclosure includes: acquiring a warning message, wherein the warning message is sent via broadcast or multicast by a line card where a failure of a link occurs; and executing link switching according to the warning message.

In an example embodiment, sending, by the line card, the warning message includes: the line card creating a broadcast group or a multicast group, and adding one or more line cards, that are managed by a main control board to which the line card belongs, to the broadcast group or the multicast group; the line card broadcasting or multicasting the warning message to each line card of the one or more line cards, when detecting that the failure of the link occurs.

In an example embodiment, sending, by the line card, the warning message includes: the line card sending the warning message via a switching network.

In an example embodiment, executing the link switching includes: extracting identification information of the warning message from the warning message; determining information of a backup link to be switched according to the identification information; switching the link to the backup link.

In an example embodiment, determining the information of the backup link according to the identification information includes: determining a forwarding chip for executing the link switching according to the identification information; acquiring the information of the backup link corresponding to the forwarding chip.

A system for link switching is provided according to another aspect of the disclosure.

The system for the link switching according to the disclosure includes: a first line card; the first line card includes: an acquiring component, configured to acquire a warning message, wherein the warning message is sent via broadcast or multicast by a second line card where a failure of a link occurs; an executing component, configured to execute link switching according to the warning message.

In an example embodiment, the system further includes: the second line card; the second line card includes: an creating component, configured to establish a broadcast group or a multicast group, and add one or more line cards, that are managed by a main control board to which the line card belongs, to the broadcast group or the multicast group; a sending component configured to broadcast or multicast the warning message to each line card of the one or more line cards, when detecting that the failure of the link occurs.

In an example embodiment, the sending component is configured to send the warning message through a switching network.

In an example embodiment, the executing component includes: an extracting element, configured to extract identification information of the warning message from the warning message; a determining element configured to determine information of a backup link to be switched according to the identification information; a switching element, configured to switch the link to the backup link.

In an example embodiment, the determining element includes: a determining sub-element, configured to determine a forwarding chip for executing the link switching according to the identification information; an acquiring sub-element, configured to acquire the information of the backup link corresponding to the forwarding chip.

In the embodiments of the disclosure, a line card, where a failure of a link occurs, broadcasts or multicasts the warning message, and executing the link switching according to the warning message acquired from the line card, so that the problem in the related art that switching information cannot be synchronized to other line cards in time when link switching is performed by a line card in a distributed system is solved and the efficiency of link switching in the distributed system is improved.

BRIEF DESCRIPTION OF THE DRAWINGS

The drawings illustrated here provided a further understanding of the disclosure and form a part of the present application, The exemplary embodiments and the description thereof are used to explain the disclosure without unduly limiting the scope of the disclosure, wherein.

DETAILED DESCRIPTION OF EMBODIMENTS

The disclosure will be will be described hereinafter in detail with reference to the drawings and in conjunction with the embodiments. It needs to be noted that the embodiments of the present application and the features in the embodiments can be combined with each other if no conflict exists.

Figure 1:
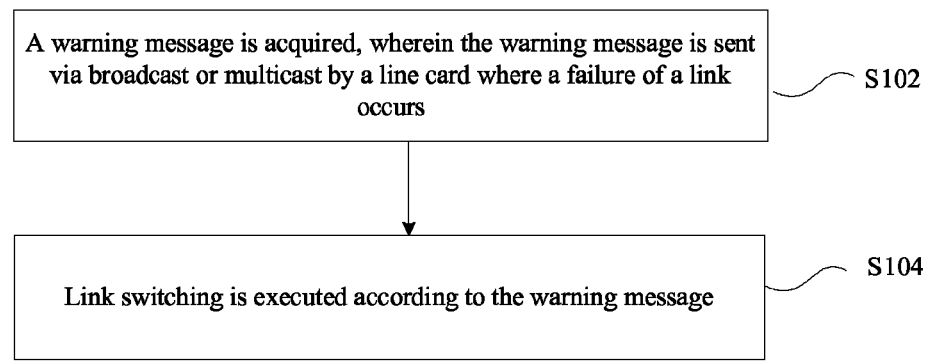
FIG. 1 is a flowchart of a method for link switching according to an embodiment of the disclosure.

FIG. 1 is a flowchart of a method for link switching according to an embodiment of the disclosure. As shown in FIG. 1, the method may include the following processing steps.

Step 102: A warning message is acquired, wherein the warning message is sent via broadcast or multicast by a line card where a failure of a link occurs.

Step 104: Link switching is executed according to the warning message.

In the related art, switching information cannot be synchronized to other line cards in time when the link switching is performed by a line card in a distributed system. By applying the method as shown in FIG. 1, a line card where a failure of a link occurs sends a warning message via broadcast or multicast, and a line card the warning message executing link switching according to the warning message acquired from the line card, so that the problem in the related art that switching information cannot be synchronized to other line cards in time when link switching is performed by a line card in a distributed system is solved and the efficiency of link switching in the distributed system is improved.

In an example embodiment, in Step 102, sending the warning message by the line card may include the following operation.

Step 1: The line card establishes a broadcast group or a multicast group, and adds one or more line cards, that are managed by a main control board to which the line card belongs, to the broadcast group or the multicast group.

Step 2: The line card broadcasts or multicasts the warning message to each line card of the one or more line cards, when detecting that the failure of the link occurs.

In an example embodiment, a control plane allocates a global session ID for each link protocol detection session. A sesTofrwd between a link protocol detection session and an entry of a forwarding table is established on each line card, indexing of a sesTofrwd table is a global session ID and a chip number, and a content of the sesTofrwd table is an index of an entry of a forwarding table of a host-backup link protection group on a forwarding chip of a current line card. A broadcast group or a multicast group is established on a chip that supports one or more detection protocols, and port numbers of CPU ports on all line cards are added into the broadcast group or multicast group.

In an example implementation process, the line card may send the warning message via a switching network.

In an example embodiment provided by the disclosure, warning information is broadcast to CPU ports of all line cards when the link procotol detection session detects that a failure of a link occurs. The warning information is switched to each line card via a switching network like a data message, which may be implemented within microseconds.

In an example embodiment, executing the link switching in Step 104 may include the following steps.

Step 3: Identification information of the warning message is extracted from the warning message.

Step 4: Information of a backup link to be switched is determined according to the identification information.

Step 5: The link is switched to the backup link.

In an example embodiment, determining the information of the backup link in Step 4 according to the identification information may include the following processing.

Step 41: A forwarding chip for executing the link switching is determined according to the identification information.

Step 42: The information of the backup link corresponding to the forwarding chip is acquired.

Figure 2:
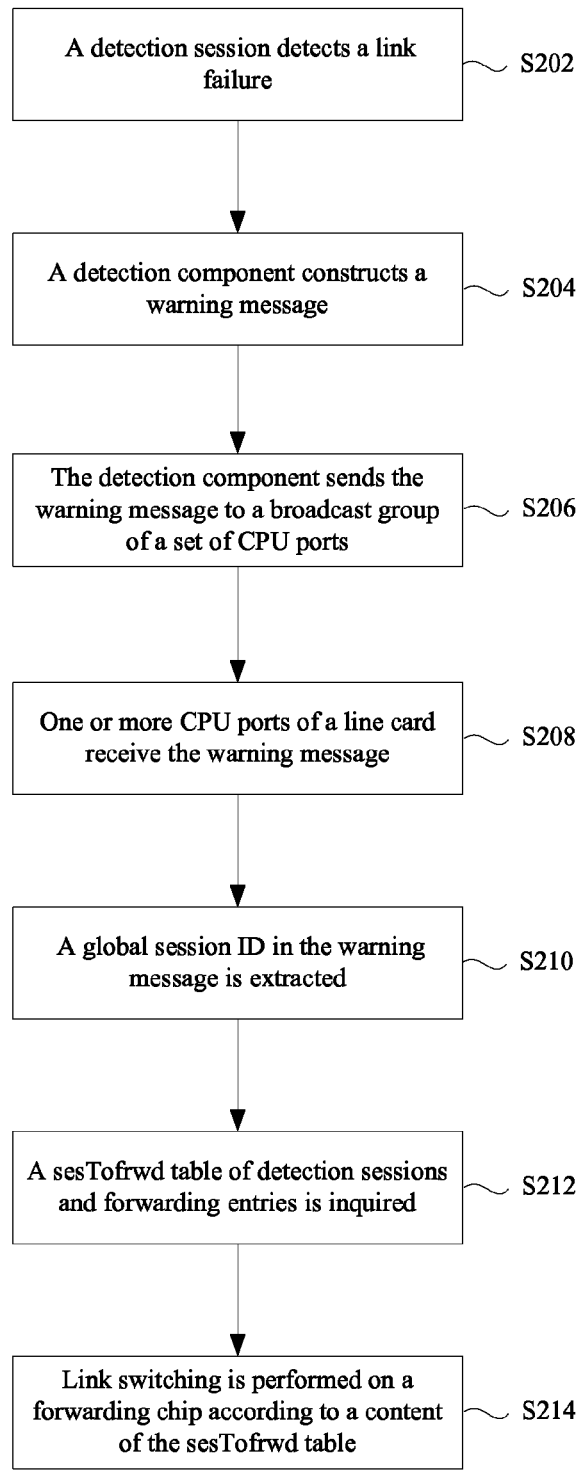
FIG. 2 is a flowchart of a method for link switching according to an example embodiment of the disclosure.

An example implementation process will be further described below in combination with an example embodiment as shown in FIG. 2.

FIG. 2 is a flowchart of a method for link switching according to an example embodiment of the disclosure. As shown in FIG. 2, the flow may include the following processing steps.

Step 202: A link failure is detected by a chip where a link protocol detection session assigned by a control plane to a line card managed by a main control board locates.

Step 204: The chip constructs a specific warning message and packages a session ID at a fixed location of the warning message.

Step 206: A broadcast group or a multicast group is established, the numbers of CPU ports on all line cards are added into the broadcast group or the multicast group and the warning message is sent to the broadcast group or the multicast group.

Step 208: One or more CPU ports on each line card managed by the main control board receive the warning message.

Step 210: Each line card extracts a session ID field from the warning message.

Step 212: Each line card looks up a sesTofrwd table by using a session ID and the number of a forwarding chip on the line card itself as indexes.

Step 214: Each line card acquires an index of a forwarding table on a specific forwarding chip respectively and performs the link switching on the forwarding chip so as to switch a service onto a backup link of a protection group. Since the link switching is performed according to an information content of the warning message after the one or more CPU ports on each line card receive the warning message, this method avoids the uncertainty of synchronization of a CPU message between boards and is able to improve the efficiency of switching practically.

It needs to be noted that a priority of the warning message may be improved according to a practical requirement in order to prevent the warning message from being lost during the switching process.

Figure 3:
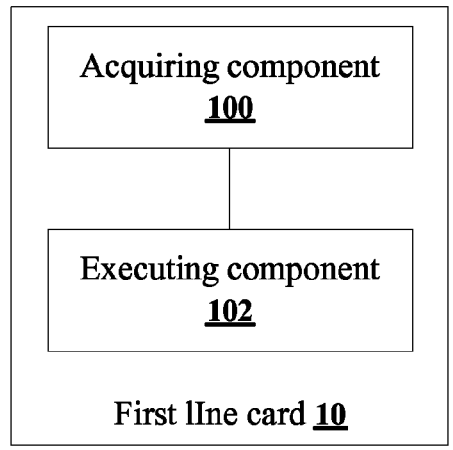
FIG. 3 is a structural diagram of a system for link switching according to an embodiment of the disclosure.

FIG. 3 is a structural diagram of a system for link switching according to an embodiment of the disclosure. As shown in FIG. 3, the system for the link switching may include: a first line card 10. The first line card 10 may include: an acquiring component 100, configured to acquire a warning message, wherein the warning message is sent via broadcast or multicast by a second line card where a failure of a link occurs; an executing component 102, configured to execute link switching according to the warning message.

The system as shown in FIG. 3 solves the problem in the related art that switching information cannot be synchronized to other line cards in time when link switching is performed by a line card in a distributed system, thus the efficiency of link switching in the distributed system is improved.

Figure 4:
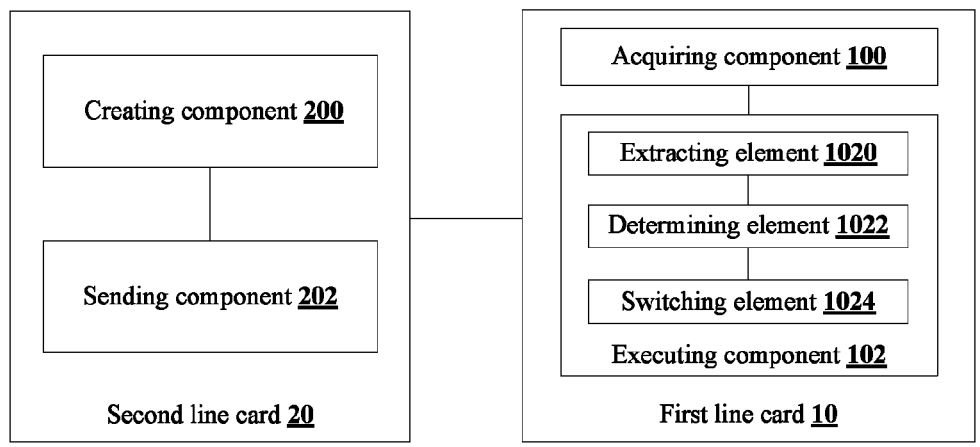
FIG. 4 is a structural diagram of a system for link switching according to an example embodiment of the disclosure.

In an example embodiment, as shown in FIG. 4, the system may further include: the second line card 20. The second line card 20 may include: an creating component 200, configured to establish a broadcast group or a multicast group, and add one or more line cards, that are managed by a main control board to which the line card belongs, to the broadcast group or the multicast group; a sending component 202 configured to broadcast or multicast the warning message to each line card of the one or more line cards, when detecting that the failure of the link occurs.

In an example implementation process, the sending component 202 is configured to send the warning message through a switching network.

In an example embodiment, as shown in FIG. 4, the executing component 102 may include: an extracting element 1020, configured to extract identification information of the warning message from the warning message; a determining element 1022 configured to determine information of a backup link to be switched according to the identification information; a switching element 1024, configured to switch the link to the backup link.

In an example embodiment, the determining element 1022 may include: a determining sub-element (not shown in FIG. 4), configured to determine a forwarding chip for executing the link switching according to the identification information; an acquiring sub-element (not shown in FIG. 4), configured to acquire the information of the backup link corresponding to the forwarding chip.

Figure 5:
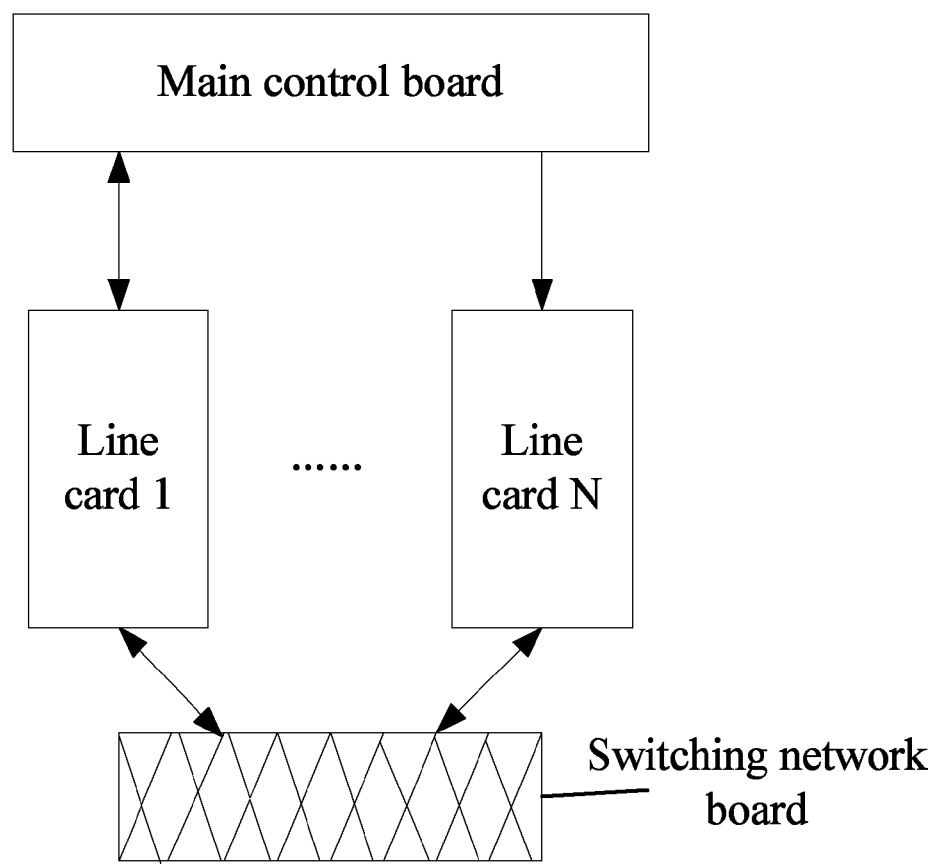
FIG. 5 is a system schematic diagram of executing link switching by a distributed system according to an example embodiment of the disclosure.

An example implementation process will be further described in combination with an example embodiment as shown in FIG. 5.

FIG. 5 is a system schematic diagram of executing link switching by a distributed system according to an example embodiment of the disclosure. As shown in FIG. 5, session numbers of link protocol detection sessions are bound with forwarding information of one or more protection links, and one or more CPU ports on each line card in a distributed system are added into a broadcast group. When detecting a link failure, a specific warning message carrying a session number of a detection session is sent to the broadcast group. After receiving the specific warning message, each line card inquires protection link information related to the specific warning message and performs link switching. In the method, it is unnecessary to synchronize switching information to each line card by a main control board after notifying the specific warning message to the main control board, thus avoiding the uncertainty of synchronization of a message between boards. Besides, the efficiency of switching a message is far higher than the efficiency of synchronization of a message between boards. Therefore, the efficiency of link switching can be improved effectively.

It may be learned from the above description that the above embodiments implement the following technical effects (it needs to be noted that these effects are effects that may be achieved by some example embodiments) that the problem in the related are that switching information cannot be synchronized to other line cards in time when link switching is performed by a line card in a distributed system is solved, thus the efficiency of link switching in the distributed system can be improved.

INDUSTRIAL APPLICABILITY

As described above, a method and system for link switching provided by the embodiments of the disclosure have the following beneficial effect that it is unnecessary to synchronize switching information to each line card by a main control board after notifying a warning message to the main control board, thus avoiding the uncertainty of synchronization of a message between boards. Besides, the efficiency of switching a message is far higher than the efficiency of synchronization of a message between boards. Therefore, the efficiency of link switching can be improved effectively.

Obviously, those skilled in the art shall understand that the above-mentioned components and steps of the disclosure can be realized by using general purpose calculating device, can be integrated in one calculating device or distributed on a network which consists of a plurality of calculating devices. Alternatively the components and the steps of the disclosure can be realized by using the executable program code of the calculating device. Consequently they can be stored in the storing device and executed by the calculating device, or they are made into integrated circuit component respectively, or a plurality of components or steps thereof are made into one integrated circuit component. In the way, the disclosure is not restricted to any particular hardware and software combination.

Above description is only to illustrate the preferred embodiments but not to limit the disclosure. Various alterations and changes to the disclosure are apparent to those skilled in the art. The protective scope defined in the disclosure shall comprise any modification, equivalent substitution and improvement within the principle of the disclosure.

What is claimed is:

1. A method for link switching, comprising:
   acquiring a warning message sent via broadcast or multicast by a line card where a failure of a link occurs; wherein sending, by the line card, the warning message comprises:
      creating, by the line card, a broadcast group or a multicast group, and adding, by the line card, one or more line cards managed by a main control board to which the line card belongs, to the broadcast group or the multicast group; and
      broadcasting or multicasting, by the line card, the warning message to each line card of the one or more line cards, when detecting that the failure of the link occurs; and
   executing link switching according to the warning message, wherein executing the link switching comprises:
      extracting identification information of the warning message from the warning message;
      determining information of a backup link to be switched according to the identification information; and
      switching the link to the backup link.

2. The method according to claim 1, wherein sending, by the line card, the warning message comprises:
   sending, by the line card, the warning message via a switching network.

3. The method according to claim 1, wherein determining the information of the backup link according to the identification information comprises:
   determining a forwarding chip for executing the link switching according to the identification information; and
   acquiring the information of the backup link corresponding to the forwarding chip.

4. A system for link switching, comprising: a first line card, and a second line card, wherein
   the first line card comprises: a first hardware processor coupled with a first memory to execute a first set of computer executable instructions stored in the first memory, wherein the first set of computer executable instructions comprises:
      an acquiring component to acquire a warning message, wherein the warning message is sent via broadcast or multicast by a second line card where a failure of a link occurs; and
      an executing component to execute link switching according to the warning message; wherein the executing component comprises: an extracting element to extract identification information of the warning message from the warning message; a determining element to determine information of a backup link to be switched according to the identification information; and a switching element to switch the link to the backup link; and
   the second line card comprises: a second hardware processor coupled with a second memory to execute a second set of computer executable instructions stored in the second memory, wherein the second set of computer executable instructions comprises:
      an creating component to establish a broadcast group or a multicast group, and add one or more line cards, that are managed by a main control board to which the line card belongs, to the broadcast group or the multicast group; and
      a sending component to broadcast or multicast the warning message to each line card of the one or more line cards, when detecting that the failure of the link occurs.

5. The system according to claim 4, wherein the sending component sends the warning message through a switching network.

6. The system according to claim 4, wherein the determining element comprises:
   a determining sub-element to determine a forwarding chip for executing the link switching according to the identification information; and
   an acquiring sub-element to acquire the information of the backup link corresponding to the forwarding chip.

* * * * *